(No Model.)
C. PEETS.
POTATO DIGGER AND BEAN HARVESTER.
No. 331,321.  Patented Dec. 1, 1885.
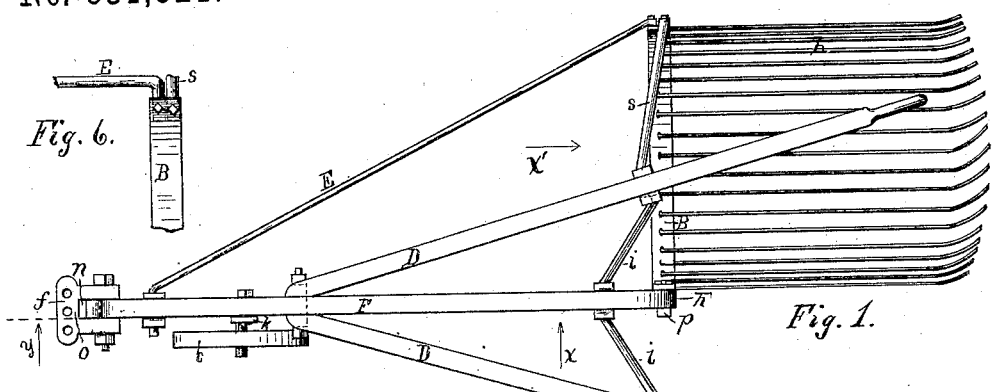
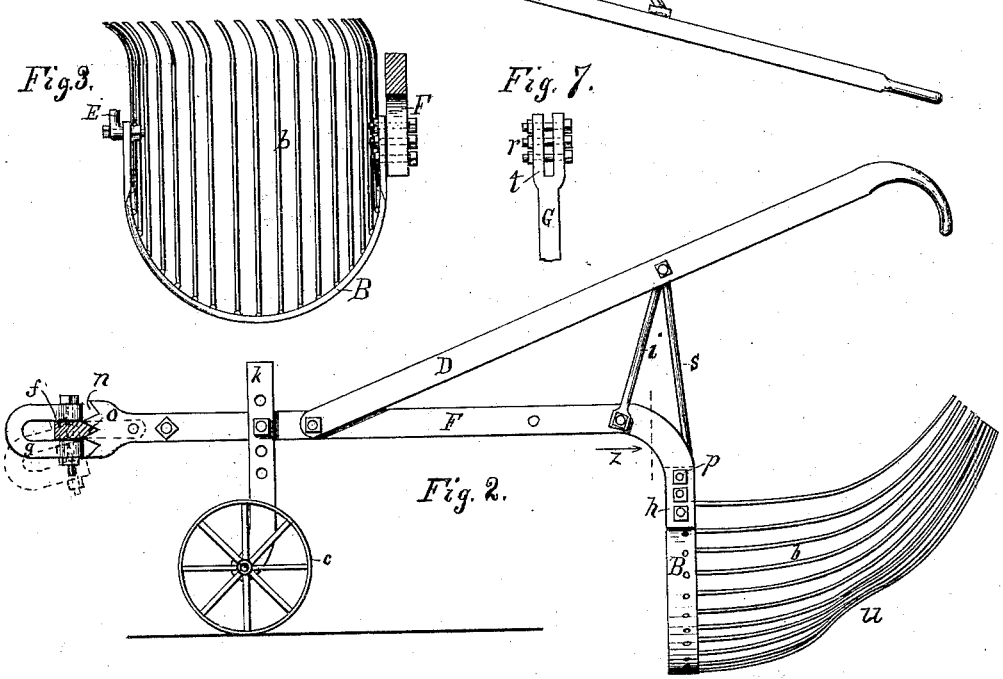
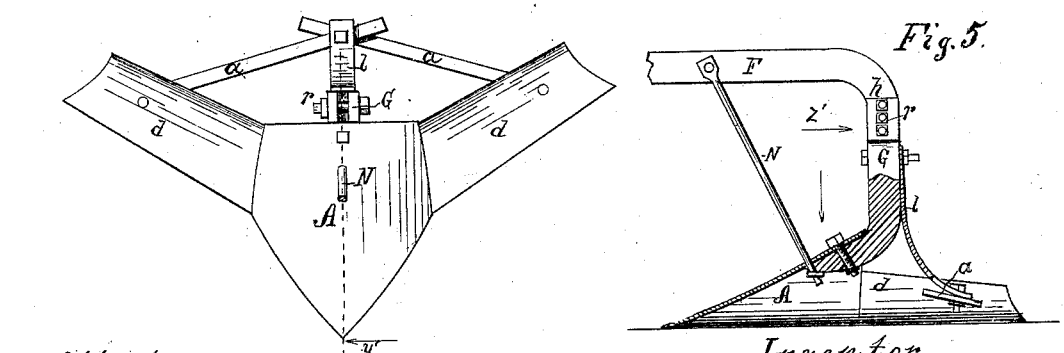
Attest.
C. B. Nash,
J. L. Reynolds,
Inventor.
Charles Peets,
By E. B. Whitmore, Atty.

UNITED STATES PATENT OFFICE.

CHARLES PEETS, OF ROCHESTER, NEW YORK.

POTATO-DIGGER AND BEAN-HARVESTER.

SPECIFICATION forming part of Letters Patent No. 331,321, dated December 1, 1885.

Application filed July 11, 1885. Serial No. 171,372. (No model.)

*To all whom it may concern:*

Be it known that I, CHARLES PEETS, of Rochester, in the county of Monroe and State of New York, have invented a new and useful Improvement in Potato-Diggers and Bean-Harvesters, which improvement is fully set forth in the following specification and shown in the accompanying drawings.

The object of my invention is to produce an improved potato-digger and bean-harvester; and it consists in the combination, with the beam of a potato-digger and bean-harvester, of a curved cutting-blade extending laterally from said beam and a series of rods, which extend backward and outward from said blade to their tips, the middle part of each one of said rods being bent to form an indentation, substantially as hereinafter set forth and claimed.

Referring to the drawings, Figure 1 is a plan of my improved potato-digger and bean-harvester; Fig. 2, a side elevation of the same, viewed as indicated by arrow $x$ in Fig. 1, the clevis being vertically sectioned, as upon the dotted line $y$ in said latter figure; Fig. 3, a view from in front of the curved blade for cutting under the roots of the vines with attached parts, seen as indicated by arrow $x'$ in Fig. 1, being transversely sectioned, as on the dotted line $z$ in Fig 2, parts being broken away and omitted; Fig. 4, a plan of the blade of a horse-hoe to be attached to the beam of the potato-digger; Fig. 5, a view showing the blade and parts shown in Fig. 4 attached to the beam, said blade and other parts being vertically sectioned, as upon the dotted line $y'$ in said latter figure, and viewed as indicated by the arrow therein; Fig. 6, a detached view of a portion at one end of the curved blade, drawn to show the manner of attaching the braces thereto; and Fig. 7, a view of the forked standard for the hoe-blade, viewed as indicated by arrow $z'$ in Fig. 5.

Referring to the parts, F is the beam of the device; D, the handle-bars; and $c$ the ground-wheel, held by a standard, $k$, attached to the beam. At the rear at $h$ the beam is bent vertically downward, to which part is secured by bolts a curved cutting-blade, B, bent substantially to the form of a semicircle, extending laterally out to the right of the beam and concaved upward. The blade stands about at right angles with the beam of the device, its outer end being supported by a brace, E, extending to a point near the forward end of the beam, and by another brace, $s$, reaching up to the nearest handle-bar, the two handle-bars being joined to the beam by braces $i$ $i$.

To the cutting-blade are attached a series of rods, $d$, extending backward therefrom, which constitute sifters for the earth to pass through while the potato vines and tubers, or the vines of the beans, as the case may be, slide upward, and are delivered over the rear end of the same. At the outer ends the rods $d$ are turned to the right for the purpose of carrying the potatoes and vines away from the feet of the person holding the handles of the potato-digger and for the further purpose of throwing the potatoes of two adjacent rows together in the space between them.

In using this potato-digger it is designed to take up the potatoes or beans in one row and throw them slightly over to the right, taking up the next row at the right of the operator when returning and throw the potatoes or beans of said row to the right, mingling them with the products of the first row for the convenience of gathering the same. At its forward end the beam is formed with notches $n$, and the inner front part, $o$, of the clevis $f$ is made V shape to fit said notches, as shown in Fig. 2, which serve to hold the clevis in positions of adjustment for causing the forward end of the beam to tend more or less upward or downward when the device is being drawn by the horse.

The blade B, with its accompanying parts, is designed to be detached from the device by loosening the bolts $p$, and disconnecting the braces E and $s$ from the beam and handle-bar, the whole being laid aside, and the horse-hoe blade A attached to the beam in its place, by which the device is readily converted into a horse-hoe. The standard G of the hoe-blade is forked at its upper end at $t$, within which to receive the downward-turned end $h$ of the beam, being secured thereto by bolts $r$. A stiffening-brace, N, extends from the hoe-blade upward and forward to the beam, as shown in Fig. 5.

By providing a cultivator-frame with a forked standard, similar to the one shown at G, the beam F may be conveniently attached to the same, a simple connection being provided at the front end of the cultivator-frame to hold the two together, the beam, handles, ground-wheel &c., thus serving for several different kinds of agricultural implements.

The rods *b* are indented upwardly at *u*, as shown in Fig. 2, which at that point causes the tubers to move more rapidly upward, leaving the earth to fall through between the rods. This quick upward moving of the potato at that point tends to lift them out of the earth, which, being finer, falls through between the rods instead of gliding up the quicker incline of the latter. The wires or teeth *b* curve upward from the indentation *u* with no intervening downward curvature. Of course the weight of the potatoes and rubbish will bend down the wires more or less, but the ends of the same will still remain higher than their body portions. The upward inclination from the swell or indentation *u* causes the rubbish, in part at least, to drop back. These teeth are made of spring-wire, large enough in diameter to answer the purpose, and when they are in use and are loaded with potatoes, earth, rubbish, &c., they will bend considerably below the position shown in side elevation in the drawings. It is not supposed that the tubers will be carried to the height shown and dropped to the ground. The teeth are made purposely elastic, and are attached to the cutting-blade, independently, so that they may yield and spring independently of each other. In use and when loaded with the passing tubers, vines, dirt, and stones the teeth are constantly bending and springing at their outer ends vertically by each other as the load is constantly shifting, the whole being bent downward to a comparatively low position. Being yielding and elastic, and intended to bend downward under a load, they naturally, when unloaded, stand high, as shown.

What I claim as my invention is—

In combination with the beam of a potato-digger and bean-harvester, a curved cutting-blade, B, extending laterally from said beam, and a series of rods, *b*, which extend backward and upward from said blade to their tips, the middle part of each one of said rods being bent to form an indentation, *u*, substantially as set forth.

CHARLES PEETS.

Witnesses:
E. B. WHITMORE,
J. L. REYNOLDS.